I. F. HARRISON.
CORN AND COTTON CUTTER AND SCRAPER.

No. 178,769. Patented June 13, 1876.

WITNESSES:
Chas. A. Pettit
Colon C. Kennon

INVENTOR:
Isaac F. Harrison
BY
ATTORNEYS.

UNITED STATES PATENT OFFICE.

ISAAC F. HARRISON, OF RODNEY, MISSISSIPPI.

IMPROVEMENT IN CORN AND COTTON CUTTERS AND SCRAPERS.

Specification forming part of Letters Patent No. 178,769, dated June 13, 1876; application filed May 17, 1876.

*To all whom it may concern:*

Be it known that I, ISAAC F. HARRISON, of Rodney, in the county of Jefferson and State of Mississippi, have invented a new and Improved Corn and Cotton Cutter and Scraper; and I do hereby declare that the following is a full, clear, and exact description of the same.

My invention is an improvement in implements designed for scraping or cutting away the sides of corn and cotton rows or ridges; and consists in a curved or bent blade adapted to be applied to an ordinary plow, and to be adjusted in position to cut away more or less of the ridge, and to be detached when required, in order to allow the plow to be used for other purposes.

Figure 1:
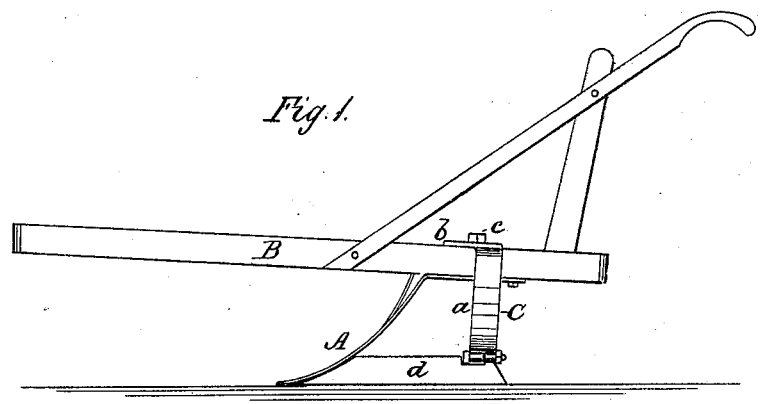
Figure 2:
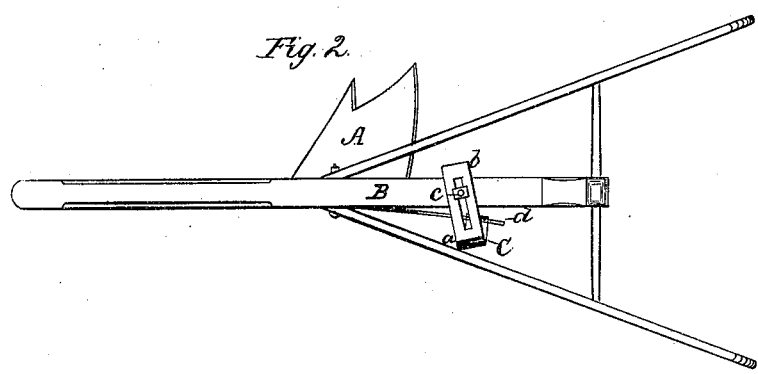
Figures 3, 4:
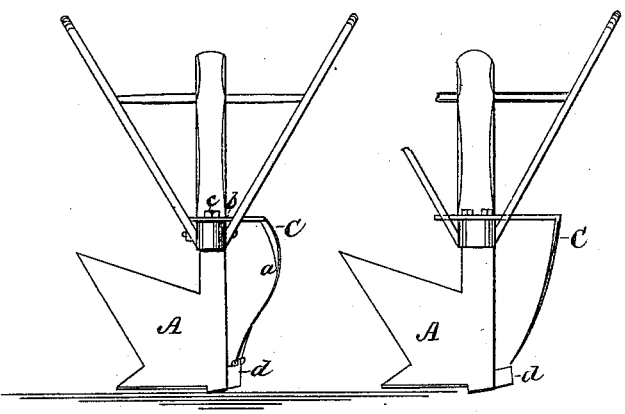

In the accompanying drawing, forming part of this specification, Figure 1 is a side elevation; Fig. 2, a plan, and Fig. 3 an end view of a plow with my improved cutter attached. Fig. 4 is a front view of a plow, provided with a modified form of cutter.

A represents the share and B the beam of an ordinary plow. The cutter C is bent at nearly a right angle, its cutting portion $a$ being curved slightly outward, as shown. The horizontal portion or arm $b$ is provided with a lengthwise slot to adapt it for attachment to the beam B by means of a screw-bolt, $c$, and for adjustment laterally. The curved part $a$ of the cutter is connected to the land-side $d$ of the plow by means of a hinge-joint, which is so constructed as to allow the cutter to be readily detached whenever it is desirable to employ the plow for its ordinary work.

It is obvious that the cutter may be adjusted laterally by loosening the nut of the bolt $c$, and may be readily clamped in its new position by screwing the nut down on the arm, as shown. Such adjustment adapts it to remove more or less of the earth from the side of the corn or cotton row or ridge, as conditions require. The earth thus cut away passes inside the land-side of the plow, and is left in such situation in the furrow as facilitates the subsequent molding operation, to wit: throwing back the loose earth toward and against the side of the ridge.

I show in Fig. 4 a modification, the cutter being attached to the beam by two bolts, and thus supported wholly independent of any connection with the land-side $d$. The cutter performs its work most efficiently, and may be furnished and applied to a plow at a minimum cost. It is designed, mainly, for application to the common plow, thus saving to the purchaser the cost of a separate plow specially adapted for corn or cotton cultivation.

What I claim is—

The cutter, bent or curved, as shown and described, to adapt it for attachment to a plow, and for adjustment laterally, as shown and described.

The above specification of my invention signed by me this 16th day of May, 1876.

ISAAC F. HARRISON.

Witnesses:
 SOLON C. KEMON,
 CHAS. A. PETTIT.